Jan. 25, 1927.
T. M. EYNON
1,615,263
PRESSURE INDICATOR FOR SHOWING GASOLINE HEIGHT
Filed Nov. 24, 1922
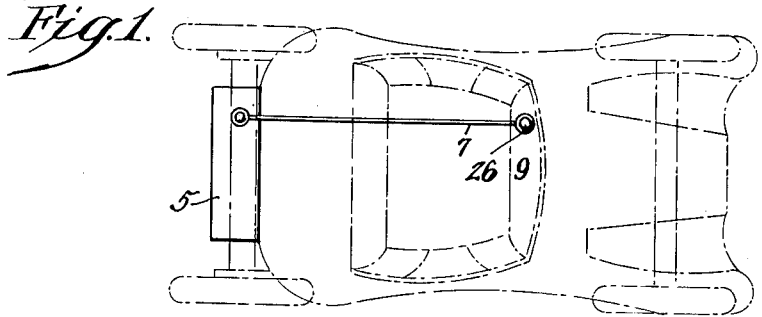
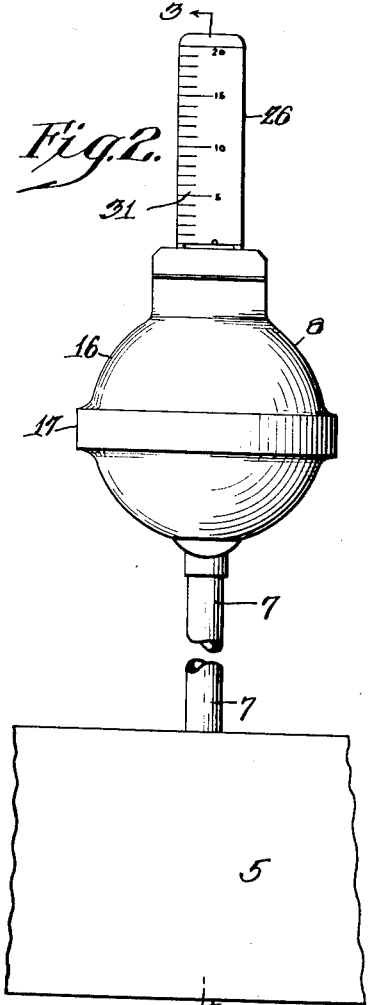
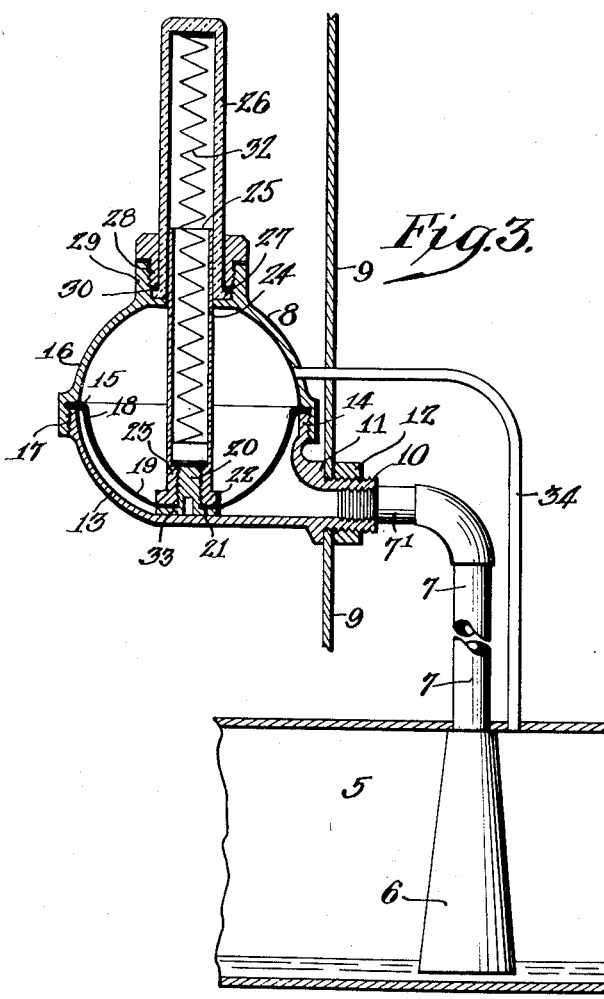
INVENTOR
Thomas M. Eynon.
BY
Wm Steell Jackson
ATTORNEY Patented Jan. 25, 1927.

1,615,263

UNITED STATES PATENT OFFICE.

THOMAS M. EYNON, OF PHILADELPHIA, PENNSYLVANIA.

PRESSURE INDICATOR FOR SHOWING GASOLINE HEIGHT.

Application filed November 24, 1922. Serial No. 602,991.

My invention relates to indicators intended for use at an automobile dash-board for showing the quantity of gasoline in the automobile tank.

A further purpose is to use an indicator glass as a guide for a cupped diaphragm and to show the indication by the position within the guide.

Further purposes will appear in the specification and in the claims.

I have preferred to illustrate my invention by one form only, selecting a form which is practical, efficient and inexpensive and which at the same time well illustrates the principles of my invention.

Figure 1 is a skeleton view of an automobile with my indicator and connections in place.

Figure 2 is a side elevation of the indicating elements and tank connection shown in Figure 1.

Figure 3 is a section of Figure 2 taken upon line 3—3.

In the drawings similar numerals indicate like parts.

The tank 5 may be under pressure at or above the atmosphere or may be subject to vacuum as preferred as my invention is applicable to any of these forms.

Within the tank I place a terminal 6, for a pipe 7, connecting with the indicator 8. The terminal is preferably of tapered form, as shown, in order that the quantity of air displaced by gasoline as it rises within the terminal may be greater for the same change of level at the lower ranges of gasoline depth than at the higher ranges thereof.

The indicator and pipe are shown approximately full size but the illustration of the tank and of the terminal within it are relatively reduced in height in Figures 2 and 3.

The indicator is mounted in any convenient way upon the dash-board 9, as by passing an externally threaded projection 10 through the dash-board and gripping the dash-board between the shoulder 11 and a nut 12. The pipe 7' connects in any suitable way as by threads shown.

The lower part of the indicator forms a bowl 13 having a terminal rim 14 against which the cup 15 is screwed by the cap member 16 threaded to the bowl rim at 17.

In order to improve the cup movement I prefer to use leather for the cup impregnated with any suitable material as an oil which does not allow the gasoline to pass readily through it and which is not unduly soluble in gasoline. The reason for this is that there will be some gasoline vapor within pipe 7. The cup is thicker at the rim 18 than at the center as at 19 and is apertured to permit the threaded stud 20 to pass through it. The cup is gripped between the head 21 and the flange 22.

The flange 22 forms the base of a sleeve 23 which extends through the aperture 24 at the top of the cap, so that its upper edge 25 will serve as an indicator within the glass scale tube 26. The scale tube is flanged as at 27 and is held in position by a sleeve 28 threaded within the cup 29. Packing will ordinarily be inserted at 30 to form a seal, to retain the glass scale tube without breaking it and to keep air pressure out. The scale is shown at 31.

Within the scale tube and the sleeve 23 I place a light resisting spring 32 which opposes vertical movement of the sleeve 23 and of the cup to which it is attached. Downward movement of the sleeve is stopped at zero point by engagement of the head 21 with the bottom 33 of the bowl.

In order to equalize the pressure on opposite sides of the cup 19, except for that due to the weight of the gasoline, in case of pressure or of vacuum within the tank, and to avoid all chance of barometric interference with the operation of the gauge if there be difficulty in making a tight joint against the scale tube, I may connect the gauge space above the cup with the space at the top of the tank as by a pipe 34.

In operation the parts are placed in the positions shown with the gasoline at what is intended to correspond with the bottom measurement on the scale, here shown as the zero point. When the gasoline height is higher than this a column of gasoline of the substantially corresponding height rises in the terminal, pushing the air along in the pipe 7. As the weight of the parts is very light there will be but little air compression and the cup with its attached indicator sleeve will be raised, showing the top of the indicator sleeve through the glass in appropriate position upon the scale.

The minimum will be automatically reset to its lowest indicating point—whatever that is—every time that the gasoline level is allowed to become lower than that with which the setting is intended to correspond.

The ease and frequency of resetting affords protection against any appreciable seasonal variation due to expansion of air or variation in the surface tension of the gasoline.

I recognize that various forms of my invention will occur to others skilled in the art in view of this disclosure and it is my purpose to include all such herein as come within the reasonable spirit and scope of my invention.

Having thus described my invention, what I claim as new and desire to secure by Letters Patent is:—

1. In an indicator for the height of gasoline in a tank, a compartment, means for connecting the compartment with the tank, said compartment comprising two parts secured together approximately at the middle, a diaphragm secured at its edges between the parts and apertured at the middle, a tube sealed to the diaphragm and secured to the diaphragm through the aperture, a sight tube above the compartment in which the first tube extends and through which the position of the first tube may be determined and a scale for indicating the pressure by movement of the first tube.

2. In an indicator for the height of gasoline in tanks, the combination of a casing divided near the middle, a flexible cup therein held at its rim between the divisions of the casing and normally having its concave face pointing upwardly, a sight tube at the upper end of the casing, spring retarded means connected to the cup and entering the sight tube for indicating the pressure upon the bottom of the cup and an inlet for fluid below the cup.

3. In a dash-board indicator for gasoline height, a two-part casing split near the middle and having one part threaded upon the other, a flexible cup engaged at its perimeter between the two parts of the casing, said cup being upwardly concave and in communication on one side with the fluid in the tank, a hollow plunger on the opposite side of the cup terminating within the normal concavity of the cup, a fastening passing through the cup to hold the plunger in fluid tight connection with the cup and means for indicating the pressure by the position of the end of the plunger farthest from the cup.

4. In an indicator for the height of gasoline in a tank, a divided casing, fluid tight both above and below the line of division and having pressure connection openings in each part thereof, a flexible cup diaphragm closing the spaces between the two compartments and apertured at the center, a sight tube connected with one of the compartments, a tubular indicator within this compartment entering the sight tube, a clamp passing through the aperture and holding the indicator to the diaphragm and a spring within the sight tube and indicator to oppose movement of the indicator within the tube in one direction.

5. In an indicator for the height of gasoline in a tank, a divided casing fluid tight above and below the point of division, a cup-shaped flexible diaphragm thinned at the center, normally concaved upwardly and held at the point of division, means for inlet connection below the diaphragm, a sight tube connected with the upper compartment and an indicator movable within the sight tube and secured to the diaphragm at its thinner part.

THOMAS M. EYNON.